May 12, 1936.  A. H. HEYROTH  2,040,771
HYGROMETRIC APPARATUS
Filed April 27, 1934   2 Sheets-Sheet 1

INVENTOR.
ALBERT H. HEYROTH

BY
ATTORNEY.

May 12, 1936. A. H. HEYROTH 2,040,771
HYGROMETRIC APPARATUS
Filed April 27, 1934 2 Sheets-Sheet 2
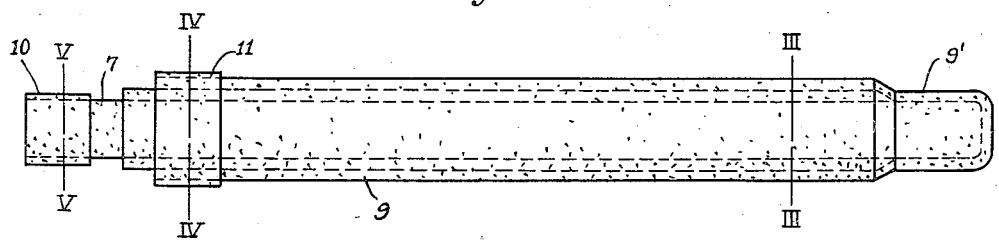
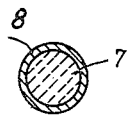
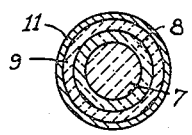
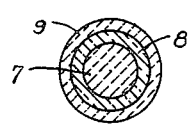
INVENTOR.
ALBERT H. HEYROTH
BY
ATTORNEY.

Patented May 12, 1936

2,040,771

UNITED STATES PATENT OFFICE 2,040,771

HYGROMETRIC APPARATUS

Albert H. Heyroth, Niagara Falls, N. Y., assignor to The Globar Corporation, Niagara Falls, N. Y., a corporation of New York Application April 27, 1934, Serial No. 722,755

2 Claims. (Cl. 73—24)

This invention relates to hygrometers and particularly to a form of hygrometer in which a thermocouple of high thermoelectric power is used in connection with a sensitive electric current meter to give indications of atmospheric humidity in the meter when provided with a suitable scale or scales.

The art of hygrometry is of importance in many industrial operations; for example, in processes of spinning and weaving. Cotton and flax, for example, are stronger when they have absorbed moisture. When the atmosphere in the mill or factory has a certain degree of humidity there is consequently less danger of breaking the threads than in a very dry atmosphere. Again in the manufacture of abrasive articles where phenolic condensation product resin is used with abrasive grain to form an abrasive mix, it has been found that the "workability" of the mix depends on the absolute humidity of the atmosphere. A method of making such an abrasive mix in a conditioned atmosphere is described in the U. S. patent to Martin, No. 1,937,043. The humidity of the air in living rooms and factories is also a matter of great importance to the health and comfort of the occupants.

Among the simpler methods of hygrometric measurement, dew-point hygrometers may be mentioned. A vessel having a polished outer surface, e. g. polished nickel, is cooled internally until the outer polished surface becomes clouded by the condensation of moisture thereon. The temperature of the vessel is then read by means of a thermometer and the pressure of water vapor in the atmosphere can be obtained from physical tables. A simple calculation gives the relative humidity. To obtain the relative humidity, it is necessary to know the temperature of the air at a sufficient distance from the cooled vessel to be unaffected by the cooling means. Some of the difficulties connected with dew-point apparatus arise in determining when the polished surface is first clouded with moisture. The observer may disturb the conditions of the experiment by breathing on the polished surface. Less than five grams of water will saturate a cubic meter of air at 0° C. A human being in repose gives off about 60 grams of water vapor per hour. It is desirable therefore to obtain indications of humidity under conditions in which the observer is some distance from the instrument. It is also desirable to have hygrometric indicators which give humidity indications on a convenient scale.

One of the simplest forms of indicating hygrometer depends on the fact that some organic substances alter their dimensions when exposed to a moist atmosphere. For example, a human hair, which has been treated to remove oil, has been observed to stretch about two and a third percent when exposed to saturated air. The stretch obtained with a given degree of saturation is used to move a pointer over a scale giving indications of humidity. While such an instrument is very useful, it is not well adapted to give humidity indications at a distance from the location of the sensitive element. A superintendent of a factory or of an office building may desire, for example, to have information at a glance with respect to the humidity of the air in the various rooms under his care.

The apparatus which is the subject of the invention will give humidity indications at any desired distance from the location of the sensitive element. This apparatus is illustrated by the accompanying drawings in which:

Figure 2 is a side view illustrating the thermocouple which constitutes part of my hygrometer device;

Figures 3, 4 and 5 are sections on the lines III—III, IV—IV, and V—V respectively as indicated in Figure 2.

Figure 1:
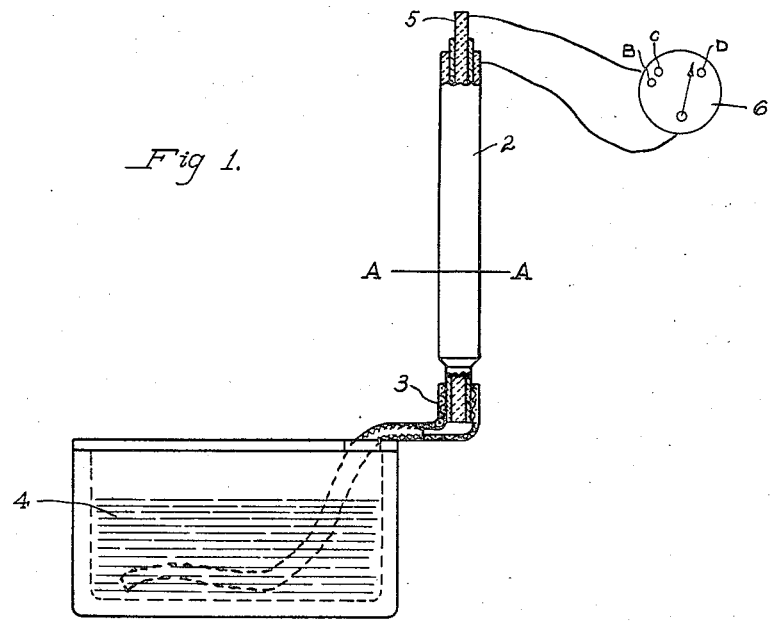
Figure 1 is a diagrammatic representation, partly in section, illustrating the general arrangement of my apparatus.

Referring to the drawing in detail, a thermocouple 2 is shown with a junction of two dissimilar elements moistened by means of a wick 3 which dips in a supply of water 4. The evaporation of water from the exposed wick 3 cools the thermoelectric junction and produces an electric current which is indicated by means of a sensitive ammeter 6 of the type which is used to indicate microamperes. For the present purpose, however, it is more convenient to have the instrument indicate the difference in temperature between the moist junction of the thermocouple and the dry end, that is the end 5 at which the leads to the instrument are joined to the respective elements of the thermocouple.

The upper end of the thermocouple (as seen in Figure 1) is soaked in paraffine (or other suitable water-proofing material) above the line A—A which may be called the impregnation boundary.

The thermocouple itself is described in a copending application, U. S. Serial No. 704,140, filed December 27, 1933. As shown especially in Figures 2, 3, 4 and 5 of the drawings in the present application, a silicon carbide rod 7 (which may be a tube or slab) constitutes one element of the thermocouple and a layer of silicon 9 constitutes the other element of the thermocouple. The silicon carbide element may be, for example, a conducting rod such as is sold under the trade name "Globar" for use in domestic heaters. Such a rod contains silicon carbide which is self-bonded by passing an electric current through the element, the current being sufficient to produce a high temperature which will cause partial recrystallization of the silicon carbide. The process of making such a conducting rod of silicon carbide is described in the U. S. patent to Hediger, No. 1,906,853, issued May 2, 1933.

The silicon carbide element 7 is covered (except near the two ends) with an insulating slurry which can be made, for example, by painting the rod with a slurry made of bentonite clay and water to within a short distance of each end and baking the slurry and rod at a temperature of about 2300° F. An insulating glaze 8 is thus formed over the portion of the rod to which the bentonite slurry was applied. The coated rod is then dipped in a slurry of powdered silicon which covers the insulating coating to within a short distance of one end (the upper end in Fig. 1) and also covers the silicon carbide at the opposite end (the lower end in Fig. 1). The silicon slurry is then dried and baked on the rod, giving the coating 9 which forms an element of the thermocouple. The end 9' (see Fig. 2) is used as the moist junction of the thermocouple in the applicant's humidity determinations. A metal coating 10 is provided on the exposed end of the silicon carbide element by spraying on it a highly conducting metal such as brass, for example, with a Schoop gun. A similar coating 11 of sprayed metal is provided on the silicon layer as indicated in Fig. 2. Leads to the indicating instrument 6 (Fig. 1) can be attached by clamping, these leads being usually made of copper wire taken from the same spool in order that the electrical properties of the two leads may be as similar as possible.

One of the advantages of the elements just described is the large thermoelectromotive force developed when the temperature of the silicon carbide-silicon junction is changed. When this junction is heated to a temperature of 600° Fahrenheit, the other ends of the elements being at room temperature, an electromotive force of of about 200 millivolts is developed. In using this thermocouple in a manner similar to that indicated in Fig. 1, it was found that in a room in a factory the currents developed varied between 5 and 12.5 microamperes in the course of a few days in accordance with humidity changes.

Figure 6:
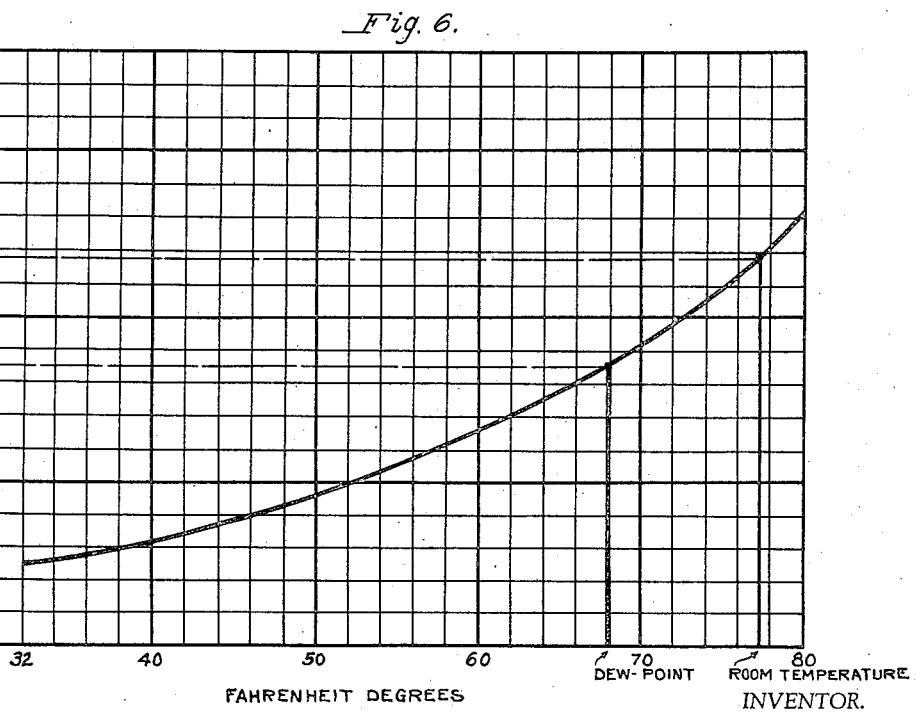
Figure 6 is a diagram showing the relationship between the pressure and temperature of saturated water vapor and illustrating a method of estimating relative humidity when the dew-point is known.

To aid in obtaining indications of humidity the scale of the instrument 6 can be calibrated to indicate the temperature difference between the moist end of the thermocouple and the dry end. The temperature of the dry end of the thermocouple may be called $t_R$ that is the temperature of the air in the part of the room where the thermocouple is placed. Let $t_W$ be the temperature of the moist end of the thermocouple. Then the instrument 6 gives current deflections which depend upon the difference in temperature between the moist end of the couple and the opposite dry end. The temperature of the moist end of the thermocouple depends, among other factors, on the difference in temperature between the air of the room and the dew-point. Where the temperature of the air in the room does not vary much the instrument 6 may be calibrated to give approximate values of the difference in temperature between the air of the room and the dew-point. When the temperature of the air in the room and the temperature of the dew-point are known, the relative humidity can be estimated approximately from a curve such as is shown in Figure 6. If $p_R$ be the pressure of saturated water vapor at the temperature of the room and $p_D$ be the corresponding quantity for water vapor at the temperature of the dew-point, then the relative humidity is approximately $$r = \frac{p_D}{p_R}$$

The relative humidity is therefore approximately the ratio of the two ordinates shown by way of example in Figure 6.

Where the temperature of the air in the room does not vary much the instrument 6 may also be calibrated to give approximate indications of relative humidity. This instrument may be calibrated, for example, by comparison with results obtained from a standard dry and wet bulb hygrometer such as is used in meteorological work. Mere indications of relative humidity are sufficient for many industrial purposes, determinations of high accuracy being unnecessary.

The superintendent of a factory or the manager of a hotel can use apparatus of the type I have described to keep informed of the state of humidity in any one of a large number of rooms. Instruments of the type described in connection with the reference number 6 can be mounted on the wall of his office and connected to thermoelectric apparatus of the character described and placed at representative points in the factory or hotel. Such humidity indications combined with temperature indications keep him informed as to conditions affecting the comfort of the occupants of rooms or as to the conditions under which various types of industrial work are being performed.

My thermoelectric apparatus can also be used to initiate changes in the humidity of the air in a room. The indicator is provided, for example, with a series of contacts B, C and D. If the atmosphere becomes too dry, the indicator needle reaches the contact B and a circuit is closed by means of which an electric motor is started and actuates a valve whose opening admits steam to the room. As the humidity goes up the needle reaches a contact C where the motor is reversed and the valve closed to shut off steam. If the atmosphere becomes too moist the needle reaches a contact D and a circuit is closed by means of which an electric motor is started and actuates a valve whose opening admits dry air to the room. As the atmosphere becomes drier the needle falls back toward its dry air position. The electric circuit is broken and spring-actuated means close the dry air valve.

A number of variations may be made in the arrangement of my apparatus and in the form and constitution of my thermocouple. For example the thermocouple may be made in tubular form or other convenient shape. The elements of the thermocouple may be made so porous that the greater part of the surface of the moist end may be exposed to the air directly, the wick covering only a small portion of the moist surface. The nature of my invention is defined by means of the appended claims.

I claim:

1. A humidity indicator comprising a non-metallic porous element and a porous metallic element having a junction of substantial area therewith, said elements constituting a thermocouple having a very high thermoelectromotive power, means for applying moisture to the outer surface of the thermocouple adjacent the junction of said elements, the outer surface of the thermocouple beyond the junction being impregnated with a non-hygroscopic material to limit the area of evaporation, and a sensitive electric current indicator connected to the separated ends of the thermocouple elements whereby the indicator is responsive to the rate of evaporation from the porous junction end of the thermocouple.

2. A humidity indicator comprising a thermocouple composed of a porous bonded silicon carbide member, a porous silicon member having a junction of substantial area therewith, means for applying moisture to the outer surface of the thermocouple adjacent the junction of said members, a non-hygroscopic coating on a portion of the outside surface of the combination of members and so placed as to limit the area of evaporation to the neighborhood of the junction of said members, said members being electrically separated beyond said junction and up to the ends of the members opposite to said junction, and a sensitive electric current indicator connected to said opposite ends of the respective members whereby the indicator is responsive to the rate of evaporation from the surface adjacent said junction.

ALBERT H. HEYROTH.